Patented Aug. 17, 1926.

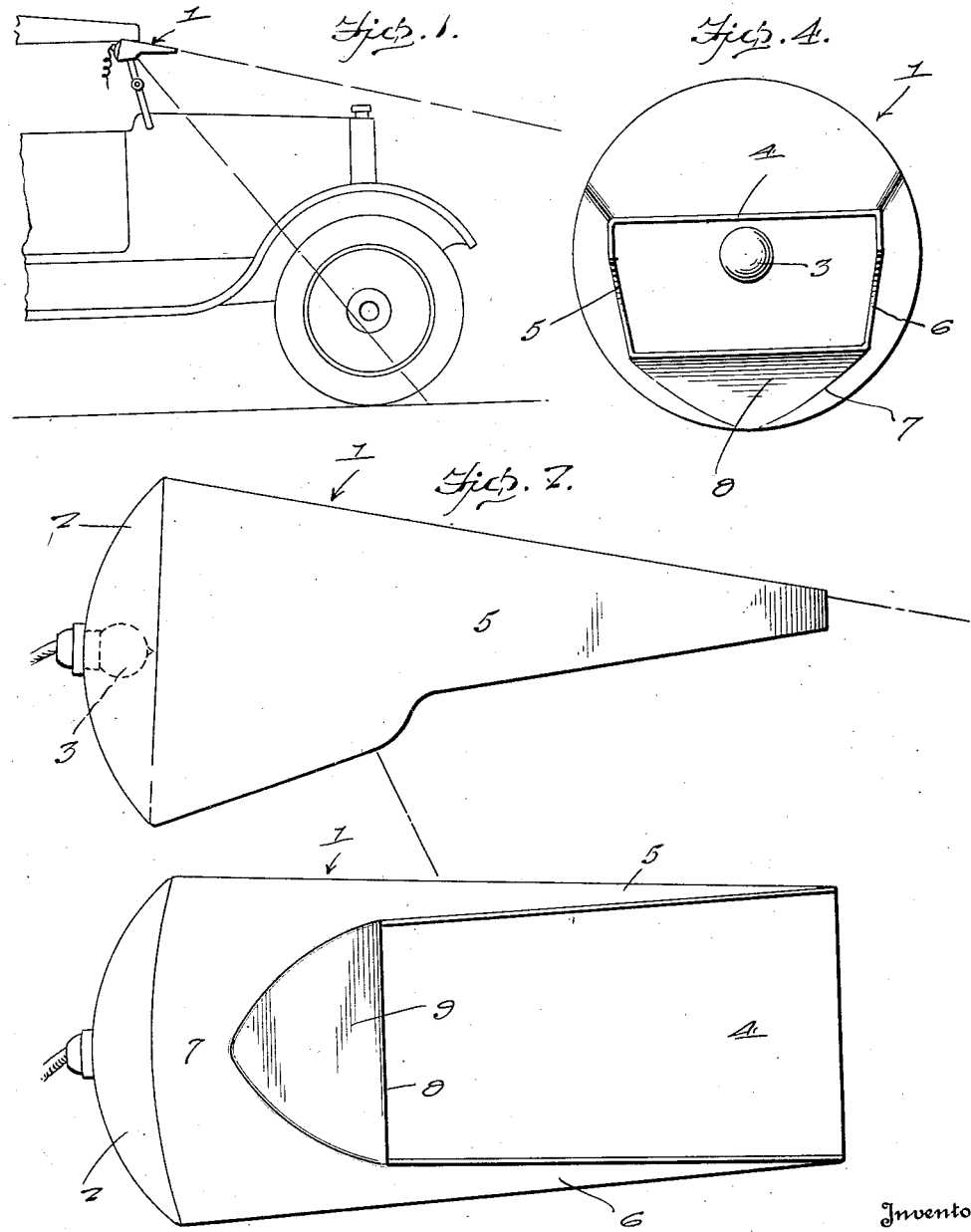

1,596,473

UNITED STATES PATENT OFFICE.

GLENN H. WHITTIER, OF COLUMBUS, NORTH DAKOTA.

NONGLARE LIGHT.

Application filed December 23, 1924. Serial No. 757,696.

This invention relates to improvements in motor vehicle lights and has for its principal object to provide one which is of such construction as to cause the rays of light to be directed forwardly and downwardly upon the ground in such a manner as to prevent an approaching driver from being blinded from the glare of the light.

A further object of the invention is to provide a non-glare light of the above mentioned character, which will provide a strong beam of light that will project forwardly a sufficient distance so that the driver of the vehicle upon which the light is mounted may see the road for a suitable distance ahead of the vehicle.

A further object of the invention is to provide a non-glare light of the above mentioned character, which is adapted to be positioned on a motor vehicle in such a manner as to cause all the rays of light to be directed downwardly upon the ground and not upwardly.

A still further object of the invention is to provide a non-glare light of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of my improved light showing the manner in which the same is supported on an automobile.

Figure 2 is a side elevation of the light per se.

Figure 3 is a bottom plan view, and

Figure 4 is a front end elevation.

In the drawing wherein for the purpose of illustration is shown the preferred embodiment of my invention, the numeral 1 designates generally my improved non-glare light and the same comprising a casing which is preferably in the form of a chute. The rear end of the casing or chute is closed by the substantially curved wall 2, and the latter provides a means for supporting within the rear portion of the casing or chute the lamp 3. The top of the casing or chute is of relatively great length and is inclined gradually toward the forward end, the same being indicated by the numeral 4. The sides of the chute or casing are designated by the numerals 5 and 6 respectively and the same converge toward the forward end.

The bottom 7 of the casing or chute is inclined upwardly toward the forward end and terminates at a point adjacent the central portion of the casing as illustrated at 8 whereby the forward portion of the bottom of the casing or chute is open as is clearly illustrated in Figure 3. The portion of the bottom adjacent the forward edge thereof is flattened as illustrated at 9. The inner surfaces of the chute or casing are highly polished to provide a reflector surface.

The light is preferably supported on the side of the windshield frame of the automobile adjacent the top thereof as more clearly illustrated in Figure 1 of the drawing. The rays of light from the lamp 3 will thus be caused to be directed forwardly and downwardly onto the road in such a manner as to prevent the glaring of the light entering the eyes of an approaching driver. Furthermore the rays of light will be directed downwardly onto the road so that the operator of the vehicle upon which the light is mounted will at all times have a full and clear vision of the road.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A non-glare light comprising a casing having a rear end closed, a light supported therein, the top of the casing gradually inclining downwardly toward the forward end and having the sides thereof converging forwardly, the side walls of the casing converging gradually toward the forward end of the casing and slanted inwardly toward their bottom edges, the bottom of the casing being inclined upwardly and forwardly and terminating at a point adjacent the center of the casing so as to cause the light rays to be directed forwardly and downwardly.

In testimony whereof I affix my signature.

GLENN H. WHITTIER.